US009485011B2

(12) United States Patent
Pivaudran

(10) Patent No.: US 9,485,011 B2
(45) Date of Patent: Nov. 1, 2016

(54) SYSTEM COMPRISING A CONTAINER AND VISUAL MEANS ABLE TO EXPRESS A PLURALITY OF VISUAL STRUCTURES

(75) Inventor: Mathieu Pivaudran, Martel (FR)

(73) Assignee: SOCIETE LOTOUISE D'EVAPORATION (SOLEV), Martel (FR)

(*) Notice: Subject to any disclaimer, the term of this patent is extended or adjusted under 35 U.S.C. 154(b) by 151 days.

(21) Appl. No.: 13/808,966

(22) PCT Filed: Jul. 8, 2011

(86) PCT No.: PCT/FR2011/051633
§ 371 (c)(1),
(2), (4) Date: Feb. 5, 2013

(87) PCT Pub. No.: WO2012/004546
PCT Pub. Date: Jan. 12, 2012

(65) Prior Publication Data
US 2013/0122817 A1 May 16, 2013

(30) Foreign Application Priority Data
Jul. 8, 2010 (FR) ...................................... 10 55584

(51) Int. Cl.
H04B 7/00 (2006.01)
H04B 7/26 (2006.01)
(Continued)

(52) U.S. Cl.
CPC ................ *H04B 7/26* (2013.01); *A45D 34/04* (2013.01); *B05B 11/0005* (2013.01);
(Continued)

(58) Field of Classification Search
CPC ........ H04B 7/26; H04B 10/07; H04B 10/43;
A61J 7/04; A61J 7/0481; A61J 9/08; A61J 2007/0427; A61J 2015/008; A61J 2200/70; A61J 2205/60; G09F 3/02; G09F 3/03; G09F 3/04; G09F 2003/0216
USPC ....................................... 455/41.1–41.3, 461
See application file for complete search history.

(56) References Cited

U.S. PATENT DOCUMENTS 8,069,056 B2 * 11/2011 Walker et al. .................... 705/2
8,279,076 B2 * 10/2012 Johnson ........................ 340/669
(Continued)

FOREIGN PATENT DOCUMENTS

FR 2 908 502 5/2008
KR 20080092038 10/2008
(Continued)

OTHER PUBLICATIONS

International Search Report dated Nov. 23, 2011, corresponding to PCT/FR2011/051633.
(Continued)

*Primary Examiner* — Simon Nguyen
(74) *Attorney, Agent, or Firm* — Young & Thompson

(57) ABSTRACT

A system in the technical field of rigid or semi-rigid packaging for cosmetic or pharmaceutical products, is intended to generate visual expressions on a plurality of packagings on the basis of information provided by an outside creator (5). This system includes a master station (4) able to emit control data ($2_{COM}$) on the basis of the information provided by the outside creator (5) via a command interface (4a) and to transmit an electronic instruction signal ($2_{INS}$), dependent on these control data ($2_{COM}$), to a remote server (2); and includes intermediate communication devices (6) able to receive, by long-distance communication, the instruction signal ($2_{INS}$) received by the remote server (2) and to transmit, by short-distance radiofrequency communication, the instruction signal ($2|_{INS}$) to a telecommunication unit (16) of a container (12).

20 Claims, 4 Drawing Sheets

(51) Int. Cl.
  *A45D 34/04* (2006.01)
  *B05B 11/00* (2006.01)
  *F21V 33/00* (2006.01)
  *F21V 8/00* (2006.01)
  *A45D 44/00* (2006.01)
  *A45D 34/00* (2006.01)

(52) U.S. Cl.
  CPC ........ *F21V 33/0004* (2013.01); *G02B 6/0035* (2013.01); *A45D 44/005* (2013.01); *A45D 2034/007* (2013.01); *A45D 2200/053* (2013.01); *A45D 2200/056* (2013.01); *A45D 2200/057* (2013.01); *B05B 11/0037* (2013.01); *B05B 11/30* (2013.01); *G02B 6/006* (2013.01); *G02B 6/0073* (2013.01)

(56) References Cited

U.S. PATENT DOCUMENTS

| | | | |
|---|---|---|---|
| 9,024,766 B2 * | 5/2015 | Hood et al. | 340/603 |
| 2003/0063460 A1 * | 4/2003 | Nadel | 362/101 |
| 2003/0086338 A1 * | 5/2003 | Sastry et al. | 368/10 |
| 2005/0108044 A1 * | 5/2005 | Koster | 705/2 |
| 2006/0103130 A1 * | 5/2006 | Koivukunnas et al. | 283/81 |
| 2006/0219858 A1 | 10/2006 | Iacovino | |
| 2006/0231109 A1 | 10/2006 | Howell et al. | |
| 2006/0277269 A1 * | 12/2006 | Dent et al. | 709/217 |
| 2007/0283878 A1 * | 12/2007 | Will | 116/308 |
| 2007/0291690 A1 * | 12/2007 | Twitchell | 370/328 |
| 2008/0104669 A1 * | 5/2008 | Niemiec et al. | 726/2 |
| 2008/0125965 A1 * | 5/2008 | Carani et al. | 701/207 |
| 2008/0297346 A1 * | 12/2008 | Brackmann et al. | 340/572.1 |
| 2009/0294521 A1 * | 12/2009 | de la Huerga | 235/375 |
| 2010/0014870 A1 | 1/2010 | Li | |
| 2010/0167704 A1 * | 7/2010 | Villemaire | 455/414.1 |
| 2011/0231011 A1 * | 9/2011 | Powers | 700/236 |

FOREIGN PATENT DOCUMENTS

| | | |
|---|---|---|
| KR | 100 920 714 | 10/2009 |
| WO | 2004/023850 | 3/2004 |
| WO | 2010/067004 | 6/2010 |

OTHER PUBLICATIONS

CN Office Action, dated Jan. 18, 2016: Application No. 201180043116.8.

\* cited by examiner

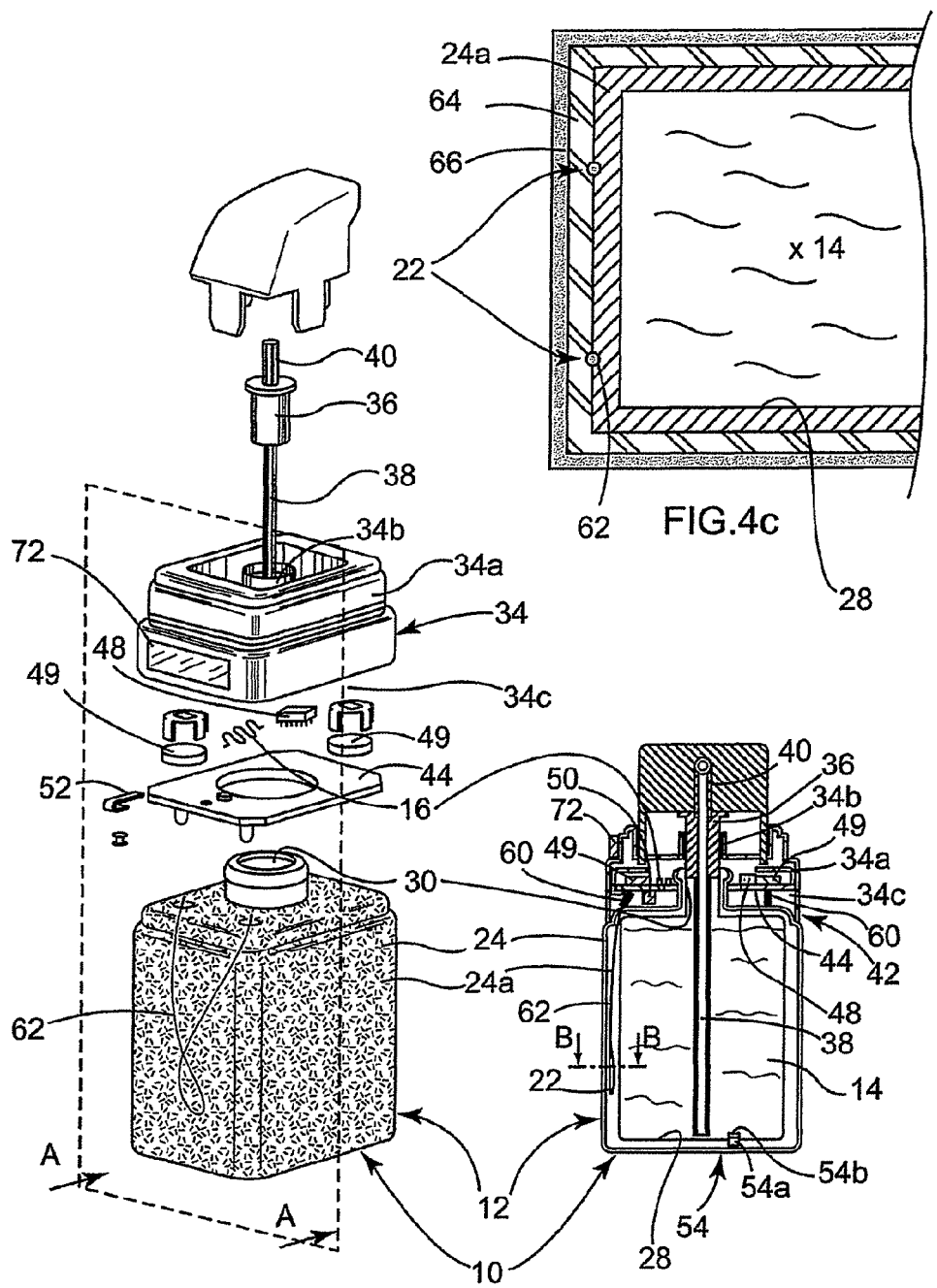

100 # SYSTEM COMPRISING A CONTAINER AND VISUAL MEANS ABLE TO EXPRESS A PLURALITY OF VISUAL STRUCTURES

BACKGROUND OF THE INVENTION

1. Field of the Invention

The invention relates to the technical field of rigid or semi-rigid packaging for cosmetic or pharmaceutical products.

More particularly, the invention relates to a system intended to generate visual expressions on a plurality of packagings on the basis of information provided by an outside creator, comprising a master station, a remote server, a plurality of intermediate communications devices and a plurality of packagings wherein each packaging includes a container intended for substantially hermetically receiving some contents in a fluid state and for a cosmetic or pharmaceutical use, with the container comprising an outer and peripheral wall having a face visible from the outside of the container and delimiting an enclosure able to substantially hermetically receive the contents in the fluid state, an opening arranged in the outer and peripheral wall to deliver the contents in the fluid state, and removable means for closing the opening. The packaging also comprises, integrated in the container and without physical, chemical or electronic contact with the content, telecommunication means able to receive at least one electronic instruction signal, control means able to emit a plurality of control signals, dependent on the electronic instruction signal received by the telecommunication means, visual means able to express a plurality of visual structures in response to the plurality of control signals established by the control means and arranged outside the enclosure delimited by the wall of the container so as to express the plurality of visual structures through the visible face of such wall.

2. Description of the Related Art

It is well known that the cosmetic and pharmaceutical industries attach much importance to the visual effects generated by the packagings since such visual effects affect customers. A certain number of attractive visual effects are thus frequently provided on the containers intended to receive cosmetic or pharmaceutical products.

Providing such visual effects consists, in certain cases, in manufacturing containers including a transparent or translucent hollow body, so that the product contained inside such hollow body can be seen. The aim of the packaging is thus to highlight the packaged product. In other cases, the containers may be submitted to decoration operations which consist, for instance, in drawing superficial patterns on the inner or outer face of the hollow body, in order to improve the visual appearance of such containers and associate therewith a picture or a brand, or even an advertising text.

However, such operations have a drawback in that they provide only a static visual effect, i.e. an effect offering no possible evolution over time. Then, if the visual aspect may be nice, it is no surprise to the user and thus very quickly becomes monotonous.

In other cases, still, it can be considered to integrate one or several light source(s) in the packaging so as to generate an original and attractive light visual effect, when the user actuates the opening button delivering the product contained in the packaging. This is the aim of document FR-A-2 908 502 which describes a packaging comprising a bottle, at least one light source, and means for automatically lighting such light source making it possible to actuate the emission of a light ray toward the inside of the bottle walls when the user actuates the push button delivering the cosmetic or pharmaceutical product contained in the bottle.

Such embodiment makes it possible to change the visual appearance of the packaging by a positive action by the user but also has several drawbacks. As a matter of fact, monotony, as mentioned above, is only partially eliminated since the change in the visual effect is generally limited to the passage from a first state to a second state and is generated by the user's action only. The evolution from a first state to a second state is thus no surprise to the user. The result is that such light effects depend on the user's action, that they may not evolve depending on parameters independent of the user, and that they cannot have irregular or surprising properties.

In another respect, several containers are known in the prior art, the visual and/or sound appearance of which may vary depending on actuation signal produced from a remote server.

In particular, document US-A-2006/0231109 describes a portable bottle having a peripheral wall, a printed circuit arranged against the inner face of the peripheral wall and a display screen embedded in a cut-out formed in such peripheral wall. The printed circuit has electronic components making it possible to communicate, by short-distance radio transmission with a wireless device or network, or by long-distance radio transmission with a remote server. Data downloaded from the remote server may be used for displaying on the screen any information or advertisement provided by the manufacturer and placed at the public's disposal from a website. This operation makes it possible to produce a promotional or informative display liable to evolve over time, depending on the manufacturer's will.

However, this method has several disadvantages. In the first place, using electronic components enabling to communicate with a remote server requires having a large space inside the portable bottle, which generates serious problems as regards overall dimensions and possibly weight. On the other hand, integrating electronic components, a printed circuit and the display screen against the inner face of the peripheral wall and in the vicinity of the visible face of such peripheral wall causes serious manufacturing problems since the latter must be hermetically separated from the bottle contents, which involves increases in the production costs and gives an insufficient strength when the product contained in the packaging is too aggressive. This is more particularly true in the cosmetic or pharmaceutical fields where the products might damage such elements. In addition, using a display screen makes it possible to supply complete information in a text, but produces no attractive or surprising visual effect on a large region of the container walls. The visual rendering is thus particularly limited and not appropriate for luxury products.

Document US-A-2006/0219858 describes a container-holder intended to receive various types of containers for beverages and comprising a mechanism aiming at producing a sound or a visual effect upon instruction from a radio receiver able to communicate with a remote control. The document thus describes, on the one hand, the presence of a radio receiver inside the container-holder and, on the other hand, the actuation of the mechanism aiming at producing a sound or a visual effect on the instruction from the remote control.

Consequently, if the radio receiver makes it possible to receive an actuation signal from a remote control for generating sound or visual effects, the system provided in this document does not allow a distant outside creator to transmit, via a remote network, instructions relative to these sound or visual effects.

Document US-A-2003/0063460 which describes a container such as a shampoo bottle comprising one or several light source(s) independently encapsulated inside the enclosure delimited by the peripheral wall of the container is also known in the prior art. Such light sources each integrate a supply source and electronic circuits enabling these to light up upon receiving a control signal transmitted by radio waves, in order to generate a decorative effect perceptible from the outside of the container.

However, this embodiment is not satisfactory since it does not produce a quality visual effect because light is diffused in the product contained in the container. On the other hand, the visual effect is badly controlled since the positioning of the light source inside the container is badly controlled.

A means composed of a group of lights intended to cause a visual effect and liable to be positioned more particularly in a perfume container is additionally known from document WO-A2-2004/023850. According to one embodiment, such means composed of a group of lights may operate within a computer-controlled network of other lights.

Such embodiment however entails problems similar to those mentioned above since neither the issue of overall dimensions nor that of strength are solved. As a matter of fact, in this case, the means composed of a group of lights are directly positioned inside the enclosure formed by the packaging and are thus directly in contact with the contents.

BRIEF SUMMARY OF THE INVENTION

In this context, the present invention aims at providing a packaging comprising a container, with the packaging being free of at least one of the above mentioned constraints.

More particularly, the invention aims at providing a system intended to generate visual expressions on a plurality of packagings on the basis of information remotely provided by an outside creator, wherein the packagings make it possible to substantially hermetically receive some contents—even corrosive contents—in a fluid state and for a cosmetic or pharmaceutical use, without requiring a too large space, or which would affect the concerned packaging.

In addition, the system according to the invention, which is additionally complying with the generic definition given in the preamble hereabove, is essentially characterized in that the master station is able to emit control data on the basis of the information provided by the outside creator via a command interface and to transmit the electronic instruction signal, dependent on these control data, to the remote server and in that each intermediate communication devices is able to receive the instruction signal received by the remote server and to transmit, by short-distance radiofrequency communication, the instruction signal to the telecommunication means of a container.

In this arrangement, the container can generate visual effects diffused through the wall thereof by changing the shade, the intensity, the patterns of such visual effects from electronic instruction signals emitted remotely by an outside creator, i.e. an artistic creator, a designer, a marketing person, a manufacturer or the like. The user's perception of the container can thus be influenced depending on data previously selected by the outside creator. The manufacturer can thus remain connected with the users by giving the container an appearance depending on his/her view at a given moment. For instance, the manufacturer may set up the parameters of the remote server so that the container emits a bright yellow colour from 6 a.m. to 10 a.m. in summer. Besides, generating such visual effects through the wall of the container makes it possible to obtain visual structures which are surprising and attractive to the user of the packaging.

Besides, using intermediate communication devices as relays between the remote server and the packaging makes it possible to limit the number of electronic components to be introduced into the packaging and thus reducing the dimensions of such electronic components. It is then easier to place these in the packaging without these being damaged by the packaging captive contents and without these causing severe constraints as regards the shape of the packaging. Using such a relay also makes it possible to limit the power consumption of the electronic components placed in the packaging and thus to guarantee a sufficient service life without having to replace the source of energy.

According to one embodiment, the packaging comprises at least one sensor, integrated in the container with or without a physical, chemical or electronic contact with the contents; the sensor being able to deliver context-sensitive information to the control means; the control means being able to receive context-sensitive information from the sensor and to emit the plurality of control signals according to such context-sensitive information too. Adding such sensor makes it possible for the packaging to emit visual effects not only depending on electric instruction signals emitted by the remote server but also depending on parameters—outside or inside the container—which should be taken into account to define the visual structure emitted by the container. The visual appearance generally defined by the manufacturer can thus be customized depending on each user's situation.

According to one embodiment, the sensor is not in physical, chemical or electronic contact with the contents and makes it possible to measure a physical quantity relative to the state of the container and/or the environment surrounding the container.

More particularly, the sensor may be selected among a list comprising: a temperature sensor, a light waves sensor, a sound waves sensor, an accelerometer, an electromagnetic waves sensor, an electric sensor, a contact sensor.

According to one embodiment, the sensor is in physical, chemical or electronic contact with the contents and so arranged as to enable the control means to determine when the quantity of contents in a fluid state is smaller than a predetermined value.

The sensor of the previous embodiment may more particularly comprise a body and a measuring head, with the body of the sensor being at least partially embedded in the lower portion of the container and the measuring head of the sensor leading to the inside of the enclosure delimited by the outer and peripheral wall. Then, when the quantity of contents in the fluid state inside the container becomes smaller than a predetermined value, the thus positioned sensor may emit a context-sensitive item of data to the control means, so that the visual effects generated by the contents can inform the user that the contents is about to be used up.

According to one embodiment, the visual means comprise a light source able to emit light rays in response to the control signals and the outer and peripheral wall comprises at least a transparent layer liable to transmit light longitudinally within the thickness thereof; the light source being positioned opposite an end edge of the outer and peripheral wall so that the light rays emitted by the light source propagate through such end edge and longitudinally within the transparent layer and at least partially diffuse outside the container so as to express a visual structure. As a matter of fact, it has been noted that the longitudinal diffusion of light within the thickness of a peripheral wall having a transparent layer, i.e. perpendicularly to the thickness direction, makes it possible to give an attractive and much brighter aesthetic appearance than lighting delivered from inside and/or outside the container. More particularly, the visible face of such peripheral wall then has a surprising and elegant visual appearance, as seen from the outside.

According to one embodiment, the peripheral wall comprises at least one optical element able to refract, reflect or disperse at least a part of the light rays emitted by the light source to the outside of the outer and peripheral wall. The intensity of the visual effect generated from inside the peripheral wall and toward the outside of such peripheral wall can thus be modulated, i.e. amplified in some places and attenuated in other places, so as to generate a visual effect of a better quality. Such effect is all the more surprising and attractive.

According to one embodiment, the wall comprises outside at least one portion of the transparent layer, an opaque coating or a coating reflecting toward the inside or the transparent layer, creating one or several pattern(s) expressing one or several visual structure(s).

According to one embodiment, the visual means comprise a conducting wire and a thermochromic coating; the conducting wire being deposited onto a layer of the wall of the container and covered with the thermochromic coating; the control means being able to emit a plurality of control signals for generating an electric current in such conducting wire so as to cause a change in the colour of the thermochromic coating. Such embodiment, which is an alternative or an addition to the one using the propagation of the light rays inside the wall of the container, also makes it possible to obtain an attractive, intense and elegant visual effect.

According to one embodiment, the thermochromic coating covers the whole layer of the wall of the container.

According to one embodiment, the visual means comprise at least two light sources able to respectively emit first light rays and second light rays of different colours in order to successively or simultaneously express different visual structures in response to the control signals.

More particularly, according to one embodiment, the two light sources are so arranged that the first light rays and the second light rays at least partially overlap inside the outer and peripheral wall.

According to one embodiment, the visual means comprise a display screen able to express at least one visual structure corresponding to a picture and/or a text, on the basis of the control signals.

According to one embodiment, the packaging also comprises sound emitting means so arranged as to express a plurality of sound structures, dependent on the control established by the remote server, upon receiving the plurality of the control signals established by the control means.

According to one embodiment, the packaging also comprises a photovoltaic solar module without any physical, chemical or electronic contact with the contents; the photovoltaic solar module being able to produce electric power from the solar radiations and to provide the telecommunication means, the control means and the visual means of the packaging with electric power.

According to one embodiment, the packaging also comprises contents in the fluid state and for a cosmetic or pharmaceutical use.

According to one embodiment, the contents is a cosmetic product.

According to one embodiment, the intermediate communication device is able to receive, by long-distance communication, the instruction signal received by the remote server.

According to an alternative embodiment, the intermediate communication device is able to communicate with a long-distance communication peripheral to receive the instruction signal from the remote server.

According to one embodiment, the intermediate communication device is able to transmit the instruction signal to the telecommunication means of the container through a communication protocol selected among: Bluetooth, UWB, Zigbee, Wifi, infrared or the like.

According to one embodiment, the intermediate communication device is able to communicate with the remote server to receive the instruction signal and to transmit the instruction signal to the telecommunication means of the container through a communication protocol selected among: Bluetooth, UWB, Zigbee, Wifi, infrared or the like.

BRIEF DESCRIPTION OF THE DRAWINGS

Other characteristics and advantages of the invention are mentioned in details in the following description which is indicative and not restrictive while referring to the appended drawings, in which:

FIG. 2a illustrates in perspective a packaging which can belong to the system shown in FIG. 1, with the packaging comprising a container and visual means more particularly consisting of two light sources able to longitudinally emit light rays within a peripheral wall of the container;

FIG. 2b illustrates a vertical section of the packaging comprising the container shown in FIG. 2a;

FIG. 4a illustrates in perspective a packaging which can belong to the system shown in FIG. 1, with the packaging comprising a container and visual means more particularly consisting of two conducting wires deposited on a layer of a wall of the container;

FIG. 4b illustrates a vertical section B-B of the packaging comprising the container shown in FIG. 4a;

FIG. 4c illustrates a horizontal section B-B of the packaging comprising the container shown in FIG. 4a;

DETAILED DESCRIPTION OF THE PREFERRED EMBODIMENTS

Figure 1:
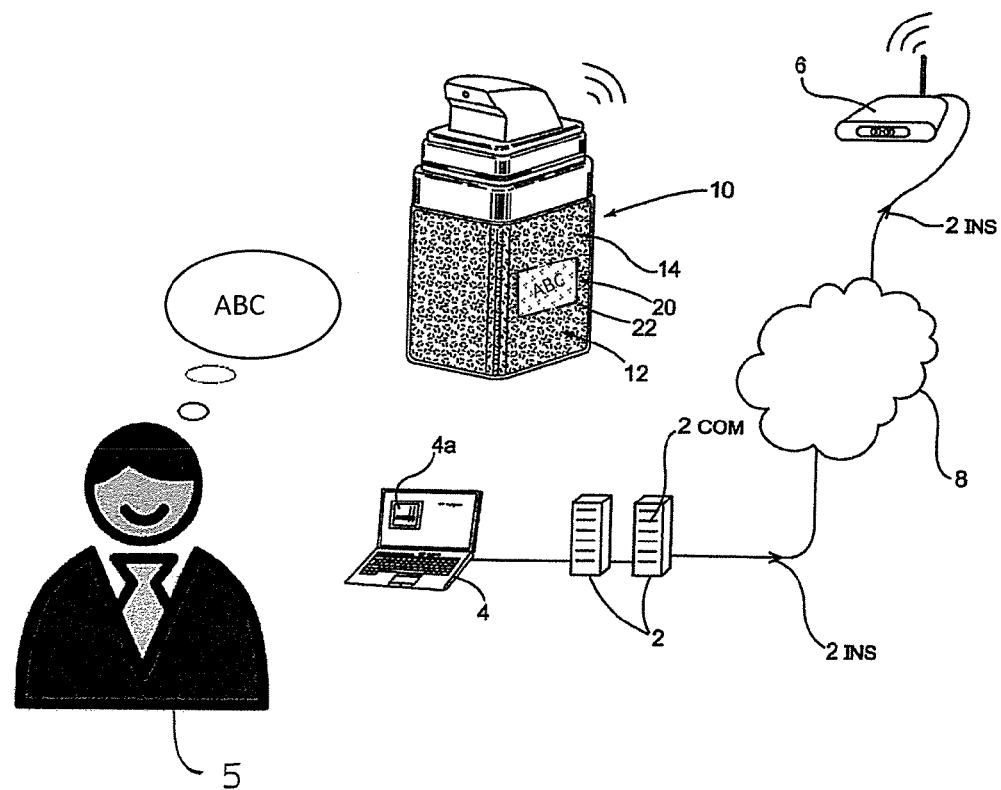
FIG. 1 is a schematic illustration of a system according to the invention comprising a packaging intended for receiving contents in the fluid state and for a cosmetic use, with the latter being in radio communication with a remote server, via an intermediate communication device so as to receive instructions provided by an outside creator.

One embodiment of the system according to the invention will now be described while referring to FIG. 1.

In this embodiment, the system comprises a remote server 2 wherein a plurality of control data 2COM can more particularly be saved. The remote server 2 is communicating by wire—or radio, if need be—with a master station 4, wherein a command interface 4a can be downloaded, which enables an outside creator 5 to save the control data 2COM, via the master station 4, in the remote server 2.

According to a particular embodiment, the master station 4 can, for instance, belong to a perfume creator which, via the command interface 4a, is able to save one or several colour shade(s) day by day in the remote server 2, depending on his/her inspiration at that moment and his/her creativity. For instance, the perfume creator may assign a specific colour shade to a predetermined week.

The persons skilled in the art will thus understand that the control data 2COM—advantageously classified in the remote server 2COM in a relational data base—may concern several aspects.

The first aspect relates to the conditions to be fulfilled for having the visual effects be executed: this may be a period (ex: from June 21st till September 21st, from 8 a.m. till 10 a.m.), a positive action by the creator on the remote server 2 or on a web site, or the execution of a predetermined condition (ex: temperature exceeds a given value, year change, etc.).

The second aspect concerned by such control data 2COM corresponds to the visual effect which must be carried out by the packaging. This second aspect is partially limited by the technical means provided on the packaging and which will be described later. However, the control data 2COM relative to this second aspect may also relate to emission colours, emission intensity, emission durations, emission frequencies, etc.

According to a third aspect, such control data 2COM may correspond to audio files, text files and more generally any type of data liable to trigger a visual and also an auditory and sense perception by the user.

It should further be noted that, depending on the embodiments (not shown in FIG. 1), a plurality of auxiliary control stations can also communicate with the remote server 2 via an auxiliary command interface—similar to or different from the command interface 4*a* used by the master station 4 and, possibly, submitted to an authentication beforehand for saving complementary control data 2COM in such remote server 2.

The remote server 2COM can thus contain not only control data 2COM corresponding to the outside creator's state of mind but additional control data corresponding to auxiliary creators' opinion, too. The remote server 2 may additionally comprise a program for managing such data 2COM so as to prioritize the utilisation of the control data 2COM by the outside creator 5 and of the control data 2COM by each auxiliary creator.

The remote server 2 is able to generate, in due time and according to the control data 2COM saved beforehand, instruction signals 2INS to one—or more generally a plurality of—intermediate communication device(s) 6 able to communicate with the remote server through any appropriate communication means. The intermediate communication device(s) 6 can thus be used as a relay between the remote server 2 and one—or several—packaging(s) 10 such as described in the following.

For example, according to a non restrictive embodiment, the remote server 2 is able to generate the instruction signals 2INS to the Internet 8 and the intermediate communication device 6 is used, on the one hand, for receiving the instruction signals 2INS from the Internet 8 and, on the other hand, as a router for transmitting such instruction signals 2INS to a packaging 10. The communication between the intermediate communication device 6 and the packaging 10 can then be established according to any appropriate protocol, such as Bluetooth, UWB, Zigbee, Wifi, infrared or the like. This solution is advantageous since it makes it possible on the one hand, to limit the number of electronic components positioned in the packaging 10 while avoiding the necessity of directly communicating with the remote server 2 and, on the other hand, to minimize the power consumption of the packaging 10.

According to an alternative embodiment, the remote server 2 may also generate instruction signals 2INS to the Internet 8, a long-distance communication peripheral such as an ADSL modem or the like may ensure the reception of the instruction signals 2INS from the Internet 8 and the intermediate communication device 6—different from the long-distance communication peripheral—may communicate with the latter using a short-distance communication protocol to receive the instruction signals 2INS prior to transmitting these to the packaging 10. This solution is also advantageous since it makes it possible to simplify the requests for communication between the packaging 10 and the intermediate communication device 6 while taking advantage of the ADSL modem or the like, which is available at the packaging 10 users'.

As regards this solution, and more particularly in the cases of the Figures which have just been described, it should be noted that "instruction signals" 2INS means any data frame integrating the instructions from the outside creator 5 and that such data frames may evolve or change depending on whether they are emitted by the remote server 2, the ADSL modem or the intermediate communication device 6.

The packaging 10 belonging to the system according to the invention will now be described in detail.

Such packaging 10 comprises a container 12 able to substantially hermetically receive some contents 14 in a fluid state and for a cosmetic or pharmaceutical use. It should be noted that container means any type of vessel which can be filled, at least partially, with contents 14 in a fluid state, without the contents 14 being able to flow out or to escape therefrom. As such contents 14 relates to the pharmaceutical and cosmetic fields, the container 12 must, in addition, be able to receive relatively corrosive and aggressive contents.

Such packaging 10 also comprises, integrated in the container 12 and without any physical, chemical or electronic contact with the contents 14, telecommunication means 16 by radio waves (not shown in FIG. 1) able to communicate with the intermediate communication device 6 for receiving the instruction signals 2INS.

The packaging 10 further comprises visual means (described in details in the following) able to express a plurality of visual structures 22 depending on such instruction signals 2INS.

The words "to express a plurality of visual structures" means a succession of at least two different visual structures resulting from a positive action of the packaging 10, with such positive action consisting of a packaging-specific evolution and not an evolution which would result only from an element outside such packaging 10. A transparent container gone through by different solar radiations at two moments of the day must not therefore be considered as able to express a plurality of visual structures. On the contrary, a light source integrated in the packaging 10 and discontinuously lighting the walls of the container 12 actually are visual means able to express a plurality of visual structures 22.

Besides, such visual structures 22 can correspond to any emission of coloured or not coloured, opaque or clear, continuous or periodical light, making it possible to visually generate an original proper state of the packaging 10.

As shown in FIG. 1, the system thus enables an outside creator 5 to save control data 2COM, via the master station 4, in the remote server 2, so that such remote server 2 can generate the instructions signals 2INS to the packaging 10, from such control data 2COM. Thanks to the instruction signals 2INS, the packaging 10 is able to express a plurality of visual structures 22 depending on the control data 2COM and thus on the vision, state of mind and will of the creator or the manufacturer who have saved such control data 2COM in the remote server 2 beforehand.

The embodiment of FIGS. 2a and 2b will now be described in details.

Figures 2A, 2B:
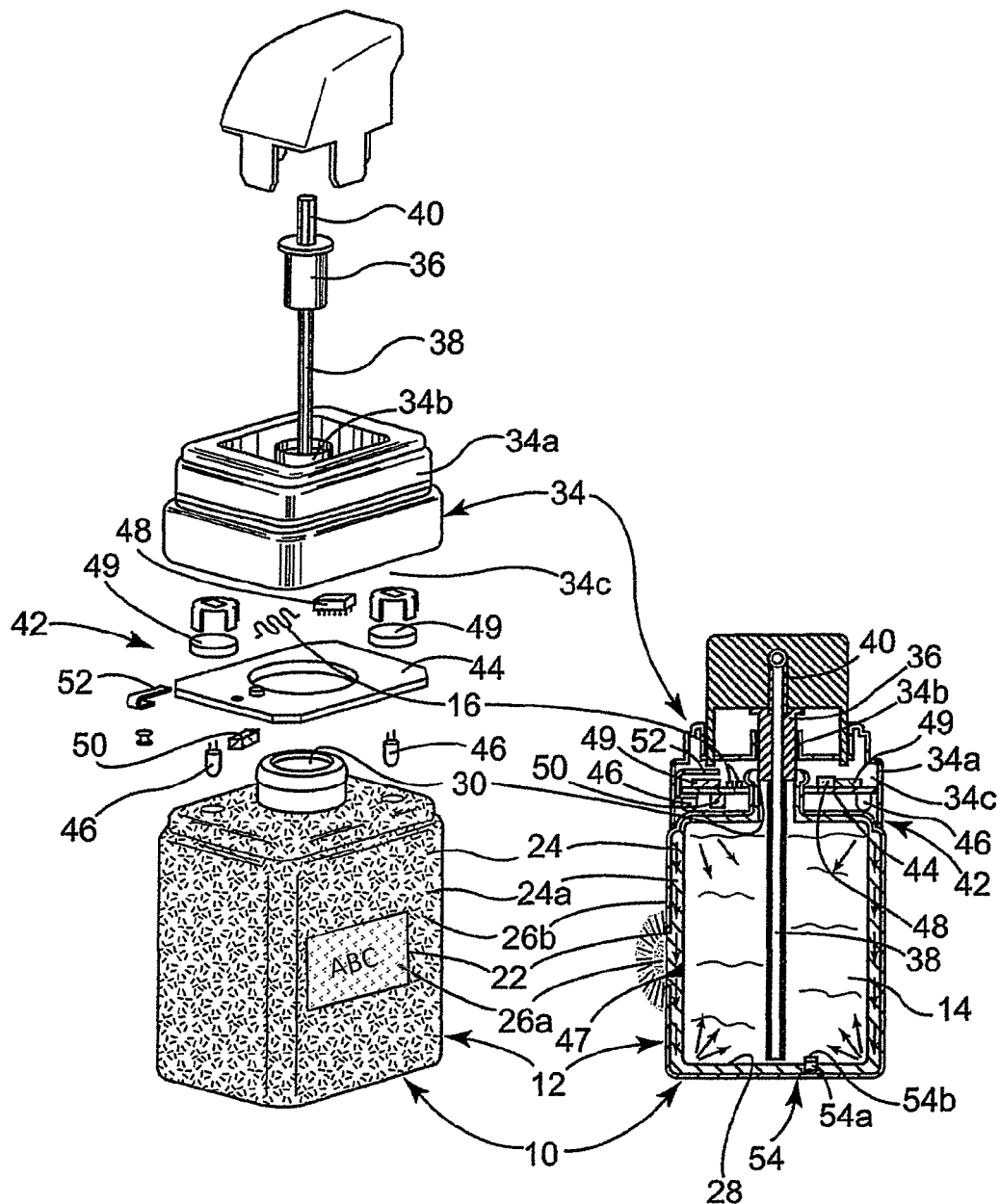

The packaging shown in FIGS. 2a and 2b comprises a container 12 able to substantially hermetically receive some contents 14 in a fluid state and for a cosmetic or pharmaceutical use, like perfume. Such container 12 is composed of an outer and peripheral wall 24 which may be rigid or semi-rigid. Such wall 24 is totally composed of a transparent layer 24a made of a synthetic material or a transparent layer 24a made of glass. For example, the synthetic material is a thermoplastic material selected among a polyolefin, a vinyl polymer, a polyamide, a polystyrene, a polycarbonate or a polyprothacrylate.

Such wall 24 has a face 26a visible from the outside of the container 12 and a complementary face 26b covered with an opaque coating. It could be considered for the wall 24 to be totally free of such opaque coating and to totally match the visible face 26a.

Such wall 24 further delimits an enclosure 28 able to substantially hermetically receive the contents 14 in the fluid state.

The container 12 is also provided with an opening arranged in the wall 24 so as to deliver the contents 14 to the user. Such opening 30 is provided in the upper portion of the container 12, opposite a lower portion of the container whereon it rests by gravity.

The packaging 10 also comprises closing means 34 composed of a lid 34a able to cover the upper part of the wall 24 and snap thereon so as to be positioned in a locking position wherein such closing means 34 are stationary relative to the wall 24 of the container 12.

Such closing means 34 also comprise a neck 34b with a geometry matching that of the opening 30. The neck 34b of the closing means 34 and the opening 30 of the container 12 are able to receive a manual—or possibly automatic—dispensing pump 36 from which a dip tube 38 extends to enable the dispensing of the liquid contained within the enclosure 28 of the container. Such pump 36 is permanently screwed or attached to the opening 30 by any other means. The pump can be moved in translation by a push button 40 along the axis of the opening 30 and with respect to the lid 34a. When the closing means 34 cover the upper part of the container 12 and are in locked position, they define an inner space 34c, wherein are integrated visual means 42 making it possible to express a plurality of visual structures 22.

According to the embodiment shown in FIGS. 2a and 2b, the visual means 42 integrated in the inner space 34c comprise a printed circuit 44 firmly attached relative to the lid 34a.

Two light sources 46 such as diodes are arranged on the printed circuit 44. More particularly, the light sources 46 are positioned on the printed circuit 44 and in the inner space 34c so as to be positioned each in the vicinity of an end edge of the wall 24 of the container 12. The light rays emitted by such light sources 46 are thus mainly emitted toward such end edge, they go through the transparent layer 24a and propagate longitudinally within the thickness of such transparent layer 24a belonging to the wall 24 of the container 12.

The inner space 34c also integrates two batteries carried by the printed circuit 44 which make it possible to provide the power required for operating the electric components forming the visual means 22.

The inner space 34c also integrates the telecommunication means 16 which make it possible to communicate with the intermediate communication device and thus, a fortiori, with the remote server 2. According to such embodiment, such telecommunication means 16 are an antenna fixed on the printed circuit 44 and able to receive by radio waves, the electronic instruction signals 2INS from the intermediate communication device 6.

Such telecommunication means 16 are further connected to control means 48—also carried by the printed circuit 44—which are able to emit a plurality of control signals, depending on the electronic instruction signal 2INS from the telecommunication means 16. More particularly, upon receiving such electronic instruction signal 2INS, the control means can emit control signals making it possible to actuate the batteries 49 for alternately or simultaneously lighting the two light sources 46.

It should be noted that such visual means 42 are able to express a plurality of visual structures 22 in response to the plurality of control signals established by the control means 48. On the other hand, such visual means 42 are arranged outside the enclosure delimited by the wall 24 of the container 12, so as to express, through the visible face 24a of such wall 24, the plurality of visual structures 22, depending on the control established by the remote server 2, upon receiving the plurality of control signals established by the control means 48.

The visual structures 22 expressed by the packaging 10 depending on the creator's, the manufacturer's or possibly the users' will are thus attractive and surprising since they are very different from the ones provided by the prior art. On the other hand, such visual structures 22 can be obtained inexpensively since the visual means 42 implemented do not require to provide a tight enclosure between the visual means 42 and the contents 14. On the contrary, according to this embodiment, tightness is directly provided by the wall 24 of said container 12.

According to the control data 2COM which have been saved on the remote server 2, the visual means 42 may more particularly express three respective states: a first state wherein both light sources are turned off, a second state where only one of the two light sources 46 is on, and a third state wherein both light sources 46 are on.

It could also be considered that such light sources 46 could be turned on and off with a phase shift so as to express respective particularly eye attractive visual expressions. In addition, the two light sources 46 can also emit on different wavelengths so as to successively or simultaneously express different visual structures in response to the control signals.

According to the embodiment shown in FIGS. 2a and 2b, the light sources are positioned at two opposite corners of the container 12. An alternative embodiment could also provide, however, for the second light source 46 to be positioned in the vicinity of the first light source 46 and so oriented that the second light rays emitted by said second light source 46 at least partially overlap the first light rays emitted by the first light source 46 inside the transparent surface 24a. Such an arrangement also makes it possible to obtain complex and thus attractive visual structures making it possible to combine several appearances and several colours, depending on whether the first, the second or both light sources are activated.

According to the embodiment shown in FIGS. 2a and 2b, the wall 24 may also comprise one or several optical element(s) 47 able to refract, reflect or disperse at least a part of the light rays emitted by the light sources 46 to the outside of the outer and peripheral wall 24. The outer and peripheral wall 14 may thus comprise a reflecting optical blade positioned in the transparent layer 24a and so oriented as to reflect the light rays propagating within the wall 24 to the outside of the container 12. The quantity of light rays propagating to the outside of the container 12 is thus increased and the visual structure is more intense and attractive.

Alternately or simultaneously, the wall 24 may also contain other optical elements making it possible to disperse or refract at least a part of the light rays propagating within the transparent layer 24a of the wall 24 so as to generate various kinds of visual structures 22 visible from the outside of the container 12.

According to one embodiment, the wall 24 comprises, outside at least a portion of the transparent layer 24a, a coating creating one or several pattern(s) expressing one or several visual structure(s). It is thus possible to obtain a plurality of light visual structures 22 representing one or several pattern(s) such as a figurative or abstract drawing or a text. According to the selected embodiment, the coating is selected among an opaque coating and a coating reflecting toward the inside of the transparent layer.

Using an opaque coating slows down the travel of the light rays when these meet the opaque coating, whereas using a reflecting coating makes it possible for such light rays to continue their travel inside the transparent layer 24a of the wall 24. It is thus possible to simply but efficiently and attractively modulate the contrast between the various visual structures 22.

It should be noted that the embodiments of FIGS. 2a and 2b, the packaging also comprises sensors 50, 52, 54 able to deliver context-sensitive information to the control means 48 so that such control means 48 can take into account the context-sensitive informations to emit the plurality of the control signals.

The packaging shown in FIGS. 2a and 2b thus comprises two outer sensors 50, 52 which are not in physical, chemical and electronic contact with the contents 14 of the container 12.

The first outer sensor 50 makes it possible to measure a physical quantity relative to the state of the container 12 and/or the environment surrounding the container 12. The first outer sensor 50 is for instance integrated in the inner space 34c delimited by the lid 34a belonging to the closing means 34 of the container 12.

Such outer sensor 50 can thus make it possible to obtain information on some physical quantities relative to the environment surrounding the container 12. In the example, the first sensor 50 may be selected among a temperature sensor, a light waves sensor, a sound waves sensor, an accelerometer, an electromagnetic waves sensor, an electric sensor, a contact sensor.

The first outer sensor 50 is also connected to the control means 48 which can thus take into account the saved measures in order to modify the visual structures 22 expressed by the visual means 42.

In addition, the second outer sensor 52 corresponds to a metal lug positioned opposite the push button 40 so as to form a switch closing when such push button 40 is actuated by the user.

Such metal lug is thus used as a position sensor making it possible to determine when the push button 40 is actuated.

In this case, the second outer sensor 52, which is additionally connected to the control means 48, transmits information to such control means 48 which may take it into account to change the nature of the visual structures 22 expressed by the visual means 42.

The packaging shown in FIGS. 2a and 2b also comprises an inner sensor 54 which is in physical, chemical or electronic contact with the contents 14 and so arranged as to enable the control means 48 to determine when the quantity of contents 14 in a fluid state is smaller than a predetermined value.

The inner sensor 54 comprises a body 54a and a measuring head 54b, with the body 54a of the sensor 54 being at least partially embedded in the lower portion of the container 12 and the measuring head 54b of the sensor 54 leading to the inside of the enclosure 28 delimited by the outer and peripheral wall 14.

When the contents 14 decreases in the container 12 and the head of the inner sensor 54 is no longer immersed in the contents 14 in a fluid state, such inner sensor 54 thus transmits text information—by a wire through the wall 14 of the container 12 or by radio waves—using the control means 48 which can take it into account to change the nature of the visual structures 22 expressed by the visual means 42. The user can thus be informed that the container 12 will soon be emptied of its contents 14.

Figure 3:
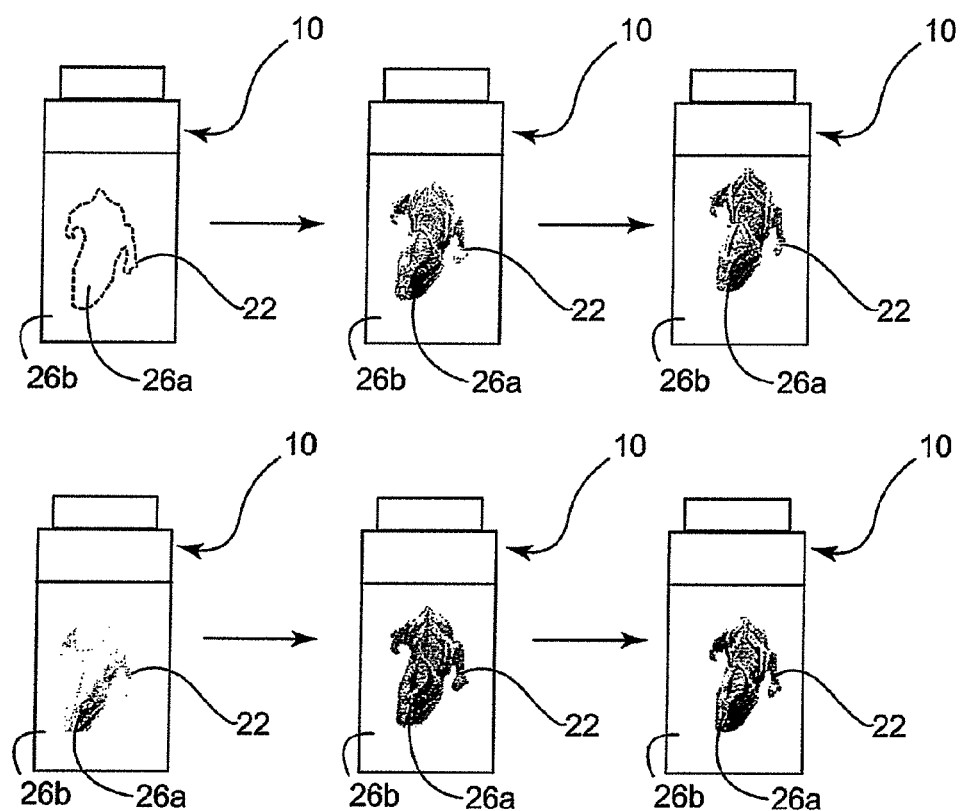
FIG. 3 is a schematic illustration of a packaging which can belong to the system shown in FIG. 1, successively expressing a plurality of visual structures of different colours.

FIG. 3 will now be described in details.

FIG. 3 schematically illustrates a packaging 10 which may belong to the system according to the invention, similar to the embodiment shown in FIGS. 2a and 2b and comprising several light sources and optical elements (not shown).

According to such embodiment, the wall 24 of the packaging comprises an outer face covered with an opaque coating creating the outline of a figurative drawing. The wall 24 thus shows a face 26a visible from the outside of the container 12 representing a chameleon and a matching face 26b covered with an opaque coating so that the rays emitted by the light sources 46 will not go through such matching face.

According to such embodiment, the control data 2COM saved by the manufacturer on the remote server 2 relate to six visual structures 22 with which predetermined time intervals are associated. For instance, a transmission time slot starting on a D day, from 12 a.m. to 4 a.m., may be assigned to the first visual structure 22—corresponding to a state wherein the light sources are inactive. A transmission time slot from 4 a.m. to 8 a.m. on a D day, is associated with the second visual structure 22—corresponding to an association of several colours. A transmission time slot from 12 p.m. to 4 p.m. on a D day, is associated with the third visual structure 22—corresponding to another association of colours. A transmission time slot from 4 p.m. to 8 p.m. on a D day, is associated with the fourth visual structure 22—corresponding to another association of colours. A transmission time slot from 8 p.m. to 12 a.m. on a D day, is associated with the fifth visual structure 22—corresponding to another association of colours. A transmission time slot from 12 p.m. to 4 a.m. on a D+1 day, is associated with the sixth visual structure 22—corresponding to another association of colours, etc.

The light sources 46 and the optical elements are further so arranged as to obtain a combination of appropriate colours for each one of the five visual structures wherein the light sources are active.

FIGS. 4a, 4b and 4c will now be described in details.

Such FIGS. 4a, 4b and 4c show, in perspective, in vertical section and in horizontal section, another embodiment of a packaging 10 which can belong to the system shown in FIG. 1.

Such packaging 10 is comprehensively complying with the embodiment shown in FIGS. 2a and 2b. It comprises a container 12 able to substantially hermetically receive some contents 14 in a fluid state and for a cosmetic or pharmaceutical use. Such container 12 is composed of an outer and peripheral wall 24 totally consisting of a transparent layer 24a made of a synthetic material such as polycarbonate. The wall 24 also delimits an enclosure 28 able to substantially hermetically receive the contents 14 in the fluid state.

The container 12 is also provided with an opening arranged in the wall 24 so as to deliver the contents 14 to the user. Such opening 30 is provided in the upper portion of the container 12, opposite a lower part of the container whereon it rests by gravity.

The packaging also comprises closing means 34 composed of a lid 34a able to cover the upper part of the wall 24 and snap thereon so as to be positioned in a locking position wherein such closing means 34 are stationary relative to the wall 24 of the container 12.

Such closing means 34 also comprise a neck 34b with a geometry matching that of the opening 30. The neck 34b of the closing means 34 and the opening 30 of the container 12 are able to receive a manual dispensing pump 36 from which a dip tube 38 extends to enable the dispensing of the liquid contained within the enclosure 28 of the container. Such pump 36 is permanently screwed or attached to the opening 30 by any other means. The pump 36 can be moved in translation by a push button 40 along the axis of the opening 30 and with respect to the lid 34a. When the closing means 34 cover the upper part of the container and are in locked position, they define an inner space 34c, wherein are integrated visual means 42 making it possible to express a plurality of visual structures 22.

According to the embodiment shown in FIGS. 4a, 4b and 4c, the visual means 42 integrated in the inner space 34c include a printed circuit 44 firmly fixed to the lid 34a.

According to the embodiment shown in FIGS. 4a, 4b and 4c, the inner space 34c integrates two batteries carried by the printed circuit 44 which make it possible to provide a first portion of the power required for operating the electric components forming the visual means 22. The packaging 10 also integrates a photovoltaic solar module 72 without any physical, chemical or electronic contact with the contents and associated with the visible face of the outer and peripheral wall 24.

Such photovoltaic solar module 72 is able to produce, from the solar radiations, a second portion—if not the whole thereof—of the power required for operating the electric components forming the visual means 22. In addition, it is connected to the printed circuit 44 so as to supply electric power to the telecommunication means 16, the control means 48, the visual means 42 and the sound emitting means of the packaging 10.

According to this embodiment, the photovoltaic solar module 72 is arranged on the lid 34a, but it could also be arranged on any other portion of the packaging 10 such as, for instance, on the outer and peripheral wall 24 of the container 12.

The inner space 34c also integrates the telecommunication means 16 which make it possible to communicate with the intermediate communication device and thus, a fortiori, with the remote server 2. According to such embodiment, such telecommunication means 16 are an antenna fixed on the printed circuit 44 and able to receive by radio waves, the electronic instruction signals 2INS from the intermediate communication device 6.

Such telecommunication means 16 are further connected to control means 48—also carried by the printed circuit 44—which, as mentioned above, are able to emit a plurality of control signals, depending on the electronic instruction signal 2INS from the antenna 16.

Two connection elements 60 connected together by a conducting wire 62 are arranged on the printed circuit 44. Electric current can thus circulate between the two connection elements 60 and through the conducting wire 62 upon an instruction from the control means 48.

The conducting wire 62 is placed on the transparent layer 24a of the outer and peripheral wall of the container 12 and creates a pattern, such as a text or a graphic drawing on such transparent layer 24a.

Besides, the conducting wire 62 on the one hand and the packaging of the transparent layer 24a, on the other hand, are covered with a thermochromic coating 64 able to change colour depending on the temperature thereof. Such thermochromic coating 64 is for instance made of leuco dyes but can also be made of any other material having the property of changing colour when submitted to a change in temperature.

Thanks to such arrangement, the control means 48 are able to generate and to circulate electric current through the conducting wire 62. The circulation of such electric current causes heating of the conducting wire 62 and a fortiori of the thermochromic coating 64 which is in contact with or in the vicinity of said conducting wire 62. Such heating thus generates a modification in the colour and/or the appearance of the thermochromic coating 64 such as a colouration or a discolouration.

As mentioned above, the visual means 42 are thus able to express a plurality of visual structures 22 in response to the plurality of control means established by the control means 48 and arranged outside the enclosure 28 delimited by the wall 24 of the container 12, so as to express, through the visible face 24a of such wall 24, the plurality of visual structures 22, depending on the control established by the remote server 2, upon receiving the plurality of control signals established by the control means 48. The visual structures 22 thus expressed are attractive and surprising since they are very different from those offered by the prior art. On the other hand, such visual structures 22 can be obtained inexpensively since the visual means 42 implemented do not require to provide a tight enclosure between the visual means 42 and the contents 14. On the contrary, according to this embodiment, tightness is directly provided by the wall 24 of said container 12.

In addition, the thermochromic coating layer 64 is preferably covered with a layer of protective varnish 66 in order to prevent any damage to the thermochromic coating 64 and thus to the visual appearance of the packaging 10 due to the handling thereof.

It should be noted that, according to a particular embodiment, the packaging 10 may simultaneously comprise visual means 42 such as those described while referring to FIGS. 2a, 2b, and those described while referring to FIGS. 4a, 4b and 4c.

According to the embodiment shown in FIGS. 4a, 4b and 4c, the packaging 10 also comprises sound emitting means (not shown) so arranged as to express a plurality of sound structures, dependent on the control established by the remote server 2, upon receiving the plurality of the control signals established by the control means 48.

Such sound emitting means are for instance composed of a miniature loud speaker making it possible to emit appropriate sounds compatible with the visual structures 22 emitted by the packaging 10. Like the visual means 42, such sound means are integrated in the inner space 34c and more particularly rigidly fixed to the printed circuit 44.

It should be noted, however, that according to alternative embodiments, the visual means 42 and the sound emitting means could also be arranged in any other position relative to the container 12. Such visual means 42 and such sound emitting means could for instance be positioned under the container 12.

Like the embodiment shown in FIGS. 2a and 2b, the wall 24 may also comprise, for instance between the thermochromic coating 64 and the protective varnish 66, a coating creating one or several pattern(s) expressing one or several visual structure(s). It is thus possible to obtain a plurality of light visual structures 22 representing one or several pattern(s) such as a figurative or abstract drawing or a text. According to the selected embodiment, the coating is selected among an opaque coating and a coating reflecting toward the inside of the transparent layer.

It should also be noted that, according to the embodiment shown in FIGS. 4a, 4b and 4c, the packaging 10 also includes sensors 50, 52, 54, as described above. For example, the packaging 10 may also integrate additional visual means 42 formed from a display screen, for instance integrated in the outer and peripheral wall 24, able to express at least a visual structure corresponding to a picture and/or a text, on the basis of the control signals.

On the other hand, it should be noted that the packaging may as well have a combination of the visual means 42 described while referring to FIGS. 2a and 2b and visual means 42 described while referring to FIGS. 4a, 4b and 4c so as to obtain several very different visual effects within the same packaging 10.

The invention claimed is:

1. A system configured to generate visual effects on a plurality of containers based on information provided by an operator, the system comprising:
    a master station configured to save control data corresponding to information provided by the operator via a command interface and to generate a command signal based on said control data and related to one or more of emission colors, intensity, duration, and frequency of the visual effects and to transmit the command signal to a remote server;
    the remote server configured to receive the instruction signal from the master station and to transmit the command signal to a plurality of intermediate communication devices;
    a plurality of intermediate communication devices, each configured to receive the command signal from the remote server and to transmit, by short-distance radiofrequency communication, the command signal to telecommunication means of a respective container; and
    a plurality of containers, each container comprising:
        an outer and peripheral enclosure-delimiting wall having a face visible from the outside of the container and delimiting an enclosure configured to substantially hermetically contain some cosmetic or pharmaceutical contents,
        an opening arranged in the outer and peripheral wall to enable delivering of the contents,
        removable means for closing the opening,
        the telecommunication means, control means, and at least one light source, embedded in the container without any physical, chemical or electronic contact with the contents, the telecommunication means of the container being configured to receive the command signal, the at least one light source discontinuously lighting the outer and peripheral enclosure-delimiting wall, and
        at least one sensor, embedded in the container with or without a physical, chemical or electronic contact with the contents, the sensor being configured to measure a physical quantity relative to the environment surrounding the container to provide context-sensitive information, the sensor being configured to deliver context-sensitive information to the control means of the container, the control means of the container being configured to receive the context-sensitive information from the sensor and to generate a plurality of control signals based on the command signal received by the telecommunication means and according to the context-sensitive information, the at least one light source of the container being configured to generate a plurality of visual effects in response to the plurality of control signals generated by the control means, the at least one light source being arranged outside the enclosure delimited by the enclosure-delimiting wall of the container to generate the plurality of visual effects through the visible face of the enclosure-delimiting wall.

2. The system according to claim 1, wherein the sensor is not in physical, chemical or electronic contact with the contents and is configured to measure a physical quantity relative to the state of the container.

3. The system according to claim 1, wherein the sensor is selected among a list comprising: a temperature sensor, a light waves sensor, a sound waves sensor, an accelerometer, an electromagnetic waves sensor, an electric sensor, and a contact sensor.

4. The system according to claim 1, wherein the sensor is in physical, chemical or electronic contact with the contents and is configured to enable the control means to determine when the quantity of contents in a fluid state is smaller than a predetermined value.

5. The system according to claim 4, wherein the sensor comprises a body and a measuring head, the body of the sensor being at least partially embedded in the lower portion of the container and the measuring head of the sensor leading to the inside of the enclosure delimited by the outer and peripheral wall of the container.

6. The system according to claim 1, wherein the at least one light source is configured to emit light rays in response to the control signals, and the outer and peripheral wall comprises at least a transparent layer configured to transmit light longitudinally within the thickness thereof, the at least one light source being positioned opposite an end edge of the outer and peripheral wall so that the light rays emitted by the light source propagate through said end edge and longitudinally within the transparent layer and at least partially diffuse outside the container to express a visual effect.

7. The system according to claim 6, wherein the peripheral wall comprises at least one optical element configured to refract, reflect or disperse at least a part of the light rays emitted by the light source to the outside of the outer and peripheral wall.

8. The system according to claim 6, wherein the wall comprises, outside at least a portion of the transparent layer, a coating creating one or more pattern expressing one or several visual effects.

9. The system according to claim 8, wherein the coating is selected among an opaque coating and a coating reflecting toward the inside of the transparent layer.

10. The system according to claim 6, wherein the at least one light source comprises at least two light sources configured to respectively emit first light rays and second light rays of different colors in order to successively or simultaneously express different visual effects in response to the control signals.

11. The system according to claim 10, wherein the two light sources are configured such that the first light rays and the second light rays at least partially overlap inside the outer and peripheral wall of the container.

12. The system according to claim 1, wherein a thermochromic coating covers the whole layer of the outer and peripheral wall of the container.

13. The system according to claim 1, wherein the container further comprises sound emitting means for expressing a plurality of sound effects, based on the control signals, upon receiving the plurality of the control signals generated by the control means.

14. The system according to claim 1, further comprising a photovoltaic solar module without any physical, chemical or electronic contact with the contents, the photovoltaic solar module being configured to generate electric power from the solar radiations and to supply the telecommunication means, the control means and the at least one light source of the container with electric power.

15. The system according to claim 1, further comprising contents in the fluid state and for a cosmetic or pharmaceutical use.

16. The system according to claim 15, wherein the contents include a cosmetic product.

17. The system according to claim 1, wherein each of the intermediate communication devices is configured to receive, by long-distance communication, the command signal from the remote server.

18. The system according to claim 1, wherein each of the intermediate communication devices is configured to communicate with a long-distance communication peripheral configured to receive the command signal from the remote server.

19. The system according to claim 1, wherein each of the intermediate communication devices is configured to transmit the command signal to the telecommunication means of the container through a communication protocol selected among: Bluetooth, UWB, Zigbee, Wifi, and infrared.

20. A system configured to generate visual effects on a plurality of containers based on information provided by an operator, the system comprising:
a master station configured to save control data corresponding to information provided by the operator via a command interface and to generate a command signal based on said control data and related to one or more of emission colors, intensity, duration, and frequency of the visual effects and to transmit the command signal to a remote server;
the remote server configured to receive the instruction signal from the master station and to transmit the command signal to a plurality of intermediate communication devices;
a plurality of intermediate communication devices, each configured to receive the command signal from the remote server and to transmit, by short-distance radiofrequency communication, the command signal to a telecommunication device of a respective container; and
a plurality of containers, each container comprising:
an outer and peripheral enclosure-delimiting wall having a face visible from the outside of the container and delimiting an enclosure configured to substantially hermetically contain some cosmetic or pharmaceutical contents,
an opening arranged in the outer and peripheral wall to enable delivering of the contents,
a removable device configured to close the opening,
the telecommunication device, a controller, and at least one light source, embedded in the container without any physical, chemical or electronic contact with the contents, the telecommunication device of the container being configured to receive the command signal, the at least one light source discontinuously lighting the outer and peripheral enclosure-delimiting wall, and
at least one sensor, embedded in the container with or without a physical, chemical or electronic contact with the contents, the sensor being configured to measure a physical quantity relative to the environment surrounding the container to provide context-sensitive information, the sensor being configured to deliver context-sensitive information to the controller of the container, the controller of the container being configured to receive the context-sensitive information from the sensor and to generate a plurality of control signals based on the command signal received by the telecommunication device and according to the context-sensitive information, the at least one light source of the container being configured to generate a plurality of visual effects in response to the plurality of control signals generated by the controller, the at least one light source being arranged outside the enclosure delimited by the enclosure-delimiting wall of the container to generate the plurality of visual effects through the visible face of the enclosure-delimiting wall.

* * * * *